Aug. 29, 1944.  O. W. REID ET AL  2,357,023
LIQUID LEVEL MEASURING APPARATUS
Filed Oct. 11, 1941
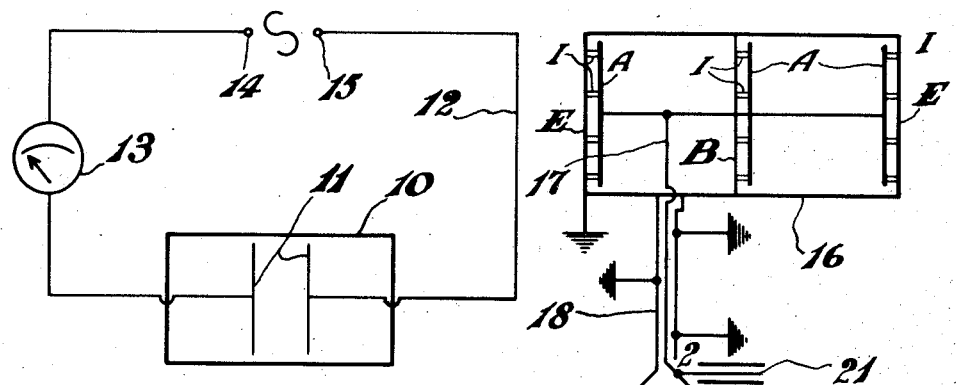
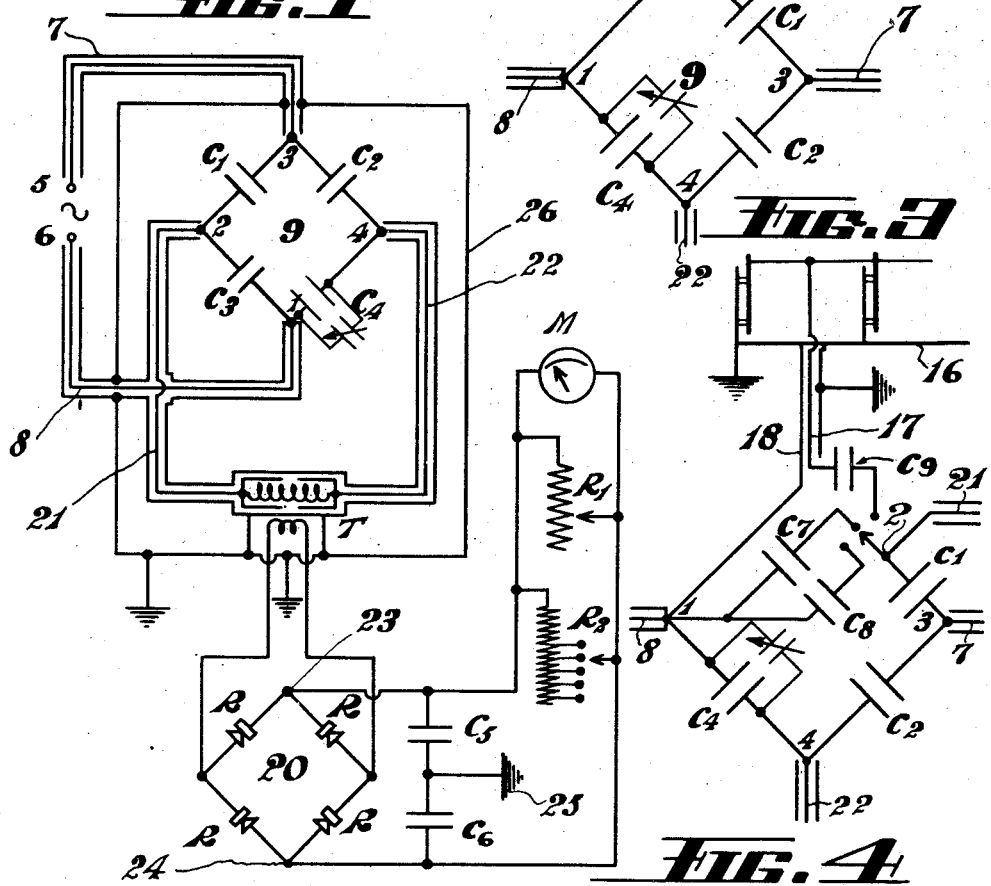
Fig. 1
Fig. 2
Fig. 3
Fig. 4
Inventors
Oliver Walter Reid and
Errol Du Preez Erasmus
By Singer, Ehlert, Stern & Carlberg
attys.

Patented Aug. 29, 1944

2,357,023

UNITED STATES PATENT OFFICE 2,357,023

LIQUID LEVEL MEASURING APPARATUS

Oliver Walter Reid and Errol du Preez Erasmus, Germiston, Transvaal, Union of South Africa Application October 11, 1941, Serial No. 414,676
In the Union of South Africa January 30, 1941

7 Claims. (Cl. 73—304)

This invention relates to an improved method of measuring and indicating the level and/or quantity of liquid in a container and to the apparatus therefor, and is particularly applicable for the purpose of accurately measuring the amount of fuel in the fuel tanks of aircraft, although the invention is also applicable to water craft, vehicles and stationary containers such as reservoir containers.

Accordingly the invention in its broadest sense consists in providing an immersion condenser unit in a liquid container, causing an alternating current of predetermined frequency to flow through said unit by the application of a predetermined alternating voltage to its terminals, making use of variation in the capacity of the condenser unit, brought about by differences in the extent of immersion thereof in the liquid constituting the dielectric, to cause proportionate changes in said alternating current, measuring said changes by means of one or more electrical measuring instruments connected into the circuit, and translating the readings of said instruments into measurements of the quantity and/or level of the liquid in the container. At least one instrument is calibrated to indicate directly the level and/or quantity of liquid in the container at any time.

In explanation it will be understood that a lowering of the level of liquid in the container, decreases the extent of the immersed area of the condenser unit, and thereby causes a diminution of capacity and, consequently, a corresponding decrease in the alternating current flowing in the circuit, while raising of the level results in a corresponding increase in the current flowing in said circuit.

According to another feature of the invention, suitable instruments are connected in the circuit for the measurement of the voltage of the applied current and for the measurement of the alternating current flowing in the circuit so that by means of a simple computation the amount of liquid in the container may be calculated, should it so happen that a varying voltage is being supplied, or the directly indicating volume measuring instrument become faulty.

In explanation of the foregoing modification of the invention, it must first of all be appreciated that the difference in capacity of the condenser when the container is full and when it is empty is appreciable, and is due to the specific inductive capacity of air being approximately unity, while that of a liquid is greater. In addition the specific inductive capacity varies according to the nature of the liquid being measured. In the case of a fuel with an octane rating of 87 the comparative figure is about 1.7 to 2. Therefore by calculation it may be shown that the minimum current ($I_{ac}^{Min}$) flowing in the circuit when the container is empty is substantially one half of the maximum current ($I_{ac}^{Max}$) flowing in the circuit when the container is full of fuel. It will therefore be readily understood that, knowing the frequency of the applied voltage, the connection of suitable measuring instruments in the circuit to enable knowledge to be obtained of the applied voltage and the alternating current flowing therein, will enable the total capacity of the condenser unit to be easily calculated, and since a certain value of the capacity corresponds to a certain quantity of liquid in the container, an accurate knowledge of this quantity is thus obtained as an additional check on the direct reading instrument or instruments.

From the foregoing it will be apparent that the invention is particularly applicable as a fuel gauge for the purpose of measuring and indicating the amount of fuel, such as petrol, in the tanks of aircraft, especially those of the larger long distance type, in which the fuel tanks are housed in the wings. The following description will accordingly apply to the use of the invention for this purpose.

According to a practical embodiment of the invention, therefore, the apparatus comprises essentially an alternating current generator, of fixed frequency, one or more electrical condensers located in the fuel tank or tanks, at least one alternating current measuring instrument in the form of an ammeter suitably calibrated in units of volume such as gallons or litres, so connected in a circuit that said instrument will register any changes in the alternating current flowing and will indicate directly the quantity of fuel in a tank or tanks. According to the previously described modification of the invention there is provided in addition a voltmeter for measuring the output voltage of the generator, and an alternating current ammeter.

A condenser unit consists of two or more spaced plates and two or more units may be located in a fuel tank in vertically disposed positions so as to act additionally as baffles to minimize surging.

The plates of any unit are divided into two groups. The plates of one group are located in the spaces between the plates of the other group and the plates comprising each group are electrically bonded together. Each group is of course electrically insulated from the other. The arrangement is such that these two groups form an electrical condenser unit the capacity of which will vary according to the nature of the dielectric between them.

The condenser unit is connected in circuit with the A. C. generator and measuring instrument in such a manner that the three are in a series circuit. Where more than one fuel tank is in use, and knowledge of the total quantity of fuel in all tanks is required, all condenser units are connected in parallel and the total capacity thus formed connected in a series circuit with the A. C. generator and measuring instrument.

In one construction each plate is embedded in a suitable insulating material in order to eliminate the hazard of fire and the leads connected thereto are likewise effectively insulated, and brought out of the tank through fuel-tight joints. Alternatively one group of plates is not embedded in insulating material and instead is electrically connected to the metal of the tank itself. In this case the lead to this group need only be connected to the outside of the tank.

From the foregoing description it is to be understood that the condenser plates divide the fuel tank into a number of compartments, communication between which is arranged by the provision of suitable apertures or slots in said plates.

In a further modification the frequency or voltage of the applied alternating current may be varied until the measuring instrument is set at a predetermined point, the volume being then read off directly from the dial which controls the variation of the frequency, or voltage, in gallons or litres.

In yet a further modification the capacity of the condenser units is obtained by using a capacity measuring circuit and the quantity or volume of liquid is read off directly from the dial of the instrument which controls the measuring of the capacity.

In the above described practical embodiments of the invention, it will be understood that, since even with a tank empty, the condenser unit therein will have a certain capacity value, a standard electrical measuring instrument will indicate a certain minimum value on its dial, when in fact the tank is completely empty. This can of course be overcome by a special calibration of the measuring instrument.

To avoid the necessity for the provision of specially calibrated instruments and to provide other advantages, use is made of an alternating current bridge circuit having two condensers of fixed and equal capacity forming a portion of each arm of the bridge and in which balance is established by completion of the arms of the bridge by means of a variable capacity condenser and the condenser unit in the liquid container. This bridge circuit is connected in circuit with the alternating current supply terminals and its output terminals are connected to the primary winding of an output transformer, the terminals of the secondary winding of which are connected in the circuit including the measuring instrument.

In the preferred arrangement current rectifying means are included in the circuit between said transformer and the measuring instrument so that the simpler and more robust direct or continuous current type of instrument may be used for measuring and indicating purposes.

With this arrangement an empty tank will be indicated on the dial of the instrument by the pointer thereof resting opposite the zero mark on the scale.

Adjustable resistors are provided in the D. C. circuit to the instrument, which, besides enabling minor adjustments to be made for calibration purposes, also enable various measurements of liquid less than the maximum, to be spread over the entire scale of the dial of the instrument for the purpose of indicating to a larger scale the amount of the liquid contents in a tank or other container. This provision in effect enables the sensitivity of a measuring instrument to be increased or decreased at will.

To enable the invention to be more clearly understood and carried into practice, reference is now made to the accompanying drawing in which like references denote like parts throughout the several views.

In the drawing—

Fig. 1 is a circuit diagram illustrating the simplest method of carrying out the invention, Fig. 2 is a circuit diagram showing the preferred method of carrying out the invention, and Fig. 3 is an incomplete circuit diagram showing, in more detail, the method of connecting the tank condenser unit into the circuit shown in Fig. 2.

Fig. 4 is a partial circuit diagram showing a modified arrangement for the same purpose.

Referring to Fig. 1 of the drawing, reference 10 denotes a container in which is arranged the immersion condenser unit 11 connected in an alternating current circuit 12 which includes an alternating current measuring instrument 13 in the form of an ammeter calibrated to indicate directly on its dial the quantity of liquid in the container 10 at any time. Alternating current of predetermined constant frequency and voltage is arranged to pass through the circuit by connecting a suitable source thereof to the terminals 14 and 15.

Figs. 2 and 3 show a preferred method of carrying out the invention as applied to the fuel tank of an aircraft denoted by reference 16. As shown in Fig. 3, the immersion condenser unit in the tank 16 consists of three pairs of electrodes, one set of plates of which is constituted by the two ends E and the central baffle plate B, while the complementary set consists of the three plates A. The plates A are secured to but insulated from the end plates E and the baffle plate B in any convenient manner, such as by spacers I of suitable insulating material. In this case one lead 17 is electrically connected to plates A, while the other lead 18 is similarly connected to the tank 16 itself which is assumed to be constructed of good current conductive material, prefereably metal. Referring to Fig. 2 it is to be noted that alternating current from an alternating current generator of fixed frequency and output voltage (not shown), is fed to the circuit by way of the terminals 5 and 6 which are connected by the screened leads 7 and 8 to the input terminals 1 and 3 of the alternating current bridge 9, in which $C_1$ and $C_2$ are condensers of fixed and equal capacity, $C_4$ is a condenser having a variable capacity and $C_3$ represents the capacity formed by the condenser unit in the tank 16, plus the capacity of the cable connecting the tank capacity to the bridge 9. More particularly the condenser $C_4$ is made up of a large fixed capacity and a small variable or adjustable capacity, the sum of both being adjusted to equal the capacity $C_3$ so as to balance the bridge.

The output terminals 2 and 4 of the bridge 9 are connected by the screened leads 21 and 22 to the primary winding of an output transformer T, the secondary winding of which is connected to the bridge rectifier circuit 20, consisting of the four current rectifiers R. As shown, the primary winding of the transformer T is provided with a double shielding system such that the two halves of the winding and the shields are identical, insofar as capacitative couplings are concerned.

The direct current output terminals 23 and 24 of the rectifier bridge 20 are connected to the direct current measuring instrument or meter M which is calibrated in liquid measure units to indicate directly the liquid contents of the tank 16. The two condensers $C_5$ and $C_6$ are connected across the D. C. terminals 23 and 24 and to an earth 25 to bypass to earth any vestiges of alternating current which may pass the rectifier bridge 20.

A resistor $R_1$, is connected across the terminals of the meter M and is provided for the purpose of making minor adjustments as regards the calibration thereof, more particularly in the case of the tank 16 being filled with a different fuel from that for which the meter M was originally set. This adjustment is made with the tank filled to its maximum extent.

A second resistor $R_2$ is likewise connected across the terminals of the meter M. This resistor is tapped at suitably spaced points as shown, and is employed for the purpose of increasing or decreasing the sensitivity of the meter M, by enabling various measurements of the liquid contents of the tank less than the maximum, to be spread over the entire scale on the dial of the instrument, whereby the meter M will indicate to a larger scale, the amount of fuel remaining in the tank. By way of example, when the tank 16 contains one quarter of its maximum contents of fuel, the meter M will require to possess four times the minimum sensitivity in order to spread this smaller amount of fuel over the entire range of the scale on the dial. The tapping points of the resistor $R_2$ are so arranged that each will correspond to a predetermined sensitivity value for the meter M. The dial of the meter M may be provided with a number of different parallel scales each corresponding to a sensitivity value given by one of the aforesaid tapping points. The minimum sensitivity of the instrument, which may be of the order of 100 microamperes, is reckoned to be the sensitivity required to spread the measurement corresponding to a completely filled tank, over the entire scale on the dial of the meter M, while the maximum sensitivity will be that sufficient to spread the smallest required fraction of the maximum contents over the dial.

The leads 7 and 8 connecting the source of current supply to points 1 and 3 of the bridge 9, should be as short as possible, they should be entirely screened and the screening earthed as shown. The screening should itself possess a minimum of self-capacity. The said leads 7 and 8, may conveniently consist of low capacity concentric cable, with the outer conductor thereof earthed to provide the required screening.

As shown in Fig. 2 the components of the bridge 9 together with the output transformer T are placed within an earthed copper-lined box 26, so as to be completely screened from stray external capacities.

The rectifier unit 20 and the condensers $C_5$ and $C_6$ should be located as close as possible to the output transformer T, but outside of the screening box 26, and are preferably housed within a suitable casing to protect them from accidental damage. The meter M together with the resistors $R_1$ and $R_2$, may be placed in any convenient position such as in the cockpit of the aircraft.

In a modification of the invention, Fig. 4, two additional condensers $C_7$, $C_8$, one equal to the capacity of the condenser unit in the tank 16 with the tank empty plus the capacity of the cable 17, 18 connecting said unit to the bridge 9, and the other equal to the capacity of this tank unit condenser and said cable capacity with the tank 16 filled to the maximum extent, are arranged to be independently switched into the alternating current bridge circuit 9 in place of the capacity represented by the condenser $C_3$ in the tank. By the use of these additional condensers in conjunction with the variable capacity portion of the condenser $C_4$ and the resistor $R_1$, the meter M may at any time be accurately set to the "empty" and "full" positions. Alternatively resistors of suitable value may be arranged to be switched into the bridge circuit in place of the condenser $C_3$ in the tank, to achieve the same result.

To reduce the fire hazard due to the very slight possibility of arcing taking place in the tank 16, an additional large capacity condenser $C_9$, Fig. 4) is inserted in the lead 17 connected to the condenser plates A. The capacity of this safety condenser is made many times larger than the capacity of the immersion condenser unit in the tank and its associated cables, by which provision the chance of arcing within the tank is practically eliminated.

The lead from the bridge 9 to the tank condenser unit may conveniently consist of low capacity concentric cable having the outer conductor earthed to provide screening. The tank 16 itself is likewise earthed and connected to the outer conductor of the aforesaid concentric cable which arrangement is clearly shown in Fig. 3.

The positioning of the several plates constituting an immersion condenser unit within a tank, may be so arranged that, tilting of the tank to various degrees within limits will not seriously affect the reading of the meter M. This result will of course be most easily obtained in the case of say a cylindrical tank with the plates of the condenser unit therein spaced symmetrically about a central plane. In this connection it will be understood that, with the co-acting electrodes of equal capacity, so long as the total immersed area of all electrodes is the same in a tilted position as it is in a horizontal position of the tank, the accuracy of the measurements indicated by the meter M will not be seriously affected, if at all. The shape, size and disposition of the electrode elements within a tank of any particular shape, may be determined by mathematical calculation so as to give substantially accurate readings both with a tank horizontal, and when it is tilted to various angles as it will be when an aircraft is in flight.

A further advantage of the invention when used as a fuel gauge, is that it will detect slight differences in the fuel with which the tank is filled. For instance if the meter M is set for a fuel having a certain octane rating, the filling of the tank 16 with a fuel having a different octane rating, will give a slightly different reading for a full tank, which discrepancy will indicate that the fuel is not equal to standard. This discrepancy in the reading after being noted, is of course easily rectified by manipulation of the movable contact of the resistor R1, as previously described.

What we claim is:

1. An apparatus for measuring and indicating the quantity of liquid in a container comprising an immersion condenser unit located in the container and for which the liquid itself forms the dielectric, an alternating current bridge circuit having two condensers of fixed and equal capacity each forming an arm of the bridge, the remaining arms being made up of a variable capacity condenser and the condenser unit of the container respectively, a source of alternating current of predetermined frequency connected in the circuit with the bridge at input points, the bridge being arranged to be in an unbalanced state as long as any liquid remains in the container, a direct reading electric instrument, the output terminals of the bridge being connected with the instrument, which instrument is calibrated to indicate at any time the amount of liquid in the container in accordance with changes in the magnitude of the current flowing from said output terminals.

2. An apparatus for measuring and indicating the quantity of liquid in a container, comprising an immersion condenser unit located in the container and for which the liquid itself forms the dielectric, an alternating current bridge circuit having two condensers of fixed and equal capacity, each forming an arm of the bridge, the remaining arms being made up of a variable capacity condenser and the condenser unit of the container respectively, a source of alternating current of predetermined frequency connected in the circuit with the bridge at input points, the bridge being arranged to be in an unbalanced state so long as any liquid remains in the container, a direct reading electric instrument, a shielded output transformer, the primary winding of which is connected to the output terminals of the bridge, the secondary winding being connected with the direct reading electric instrument which is calibrated to indicate at any time the amount of liquid in the container in accordance with changes in the magnitude of the current flowing from said output terminals.

3. An apparatus for measuring and indicating the quantity of liquid in a container, comprising an immersion condenser unit located in the container and for which the liquid itself forms the dielectric, an alternating current bridge circuit having two condensers of fixed and equal capacity each forming an arm of the bridge, the remaining arms being made up of a variable capacity condenser and the condenser unit of the container respectively, a source of alternating current of predetermined frequency connected in the circuit with the bridge at input points, the bridge being arranged to be in an unbalanced state so long as any liquid remains in the container, a direct reading electric instrument, a shielded output transformer having its primary winding connected to the output terminals of the bridge, a current rectifying means connected with the secondary winding of the shielded output transformer, the direct reading electric instrument being connected with the current rectifying means and being calibrated to indicate at any time the amount of liquid in the container in accordance with changes in the magnitude of the current flowing from the output terminals of the bridge.

4. An apparatus for measuring and indicating the quantity of liquid in a container, as set forth in claim 3, including a calibrating resistor connected across the terminals of the measuring instrument adapted for adjustment of the reading scope of the instrument to liquids of different dielectric constants.

5. An apparatus for measuring and indicating the quantity of a liquid in a container comprising an immersion condenser unit located in the container and for which the liquid itself forms the dielectric, an alternating current bridge circuit having two condensers of fixed and equal capacity, each forming an arm of the bridge, the remaining arms being made up of a variable capacity condenser and the condenser unit of the container respectively, a source of alternating current of predetermined frequency connected in circuit with the bridge at the input points, the bridge being arranged to be in an unbalanced state so long as any liquid remains in the container, a direct reading electric instrument, a shielded output transformer having its primary connected to the output points of the bridge, a bridge rectifier circuit having its input terminals connected with the secondary winding of said output transformer, the direct reading electric instrument being connected with the output points of said rectifying bridge circuit, and a pair of condensers of equal capacity in ground connection shunted across the direct reading electric instrument.

6. An apparatus for measuring and indicating the quantity of liquid in a container, comprising an immersion condenser unit located in the container and for which the liquid itself forms the dielectric, an alternating current bridge circuit having two condensers of fixed and equal capacity, each forming an arm of the bridge, the remaining arms being made up of a variable capacity condenser and the condenser unit of the container respectively, a source of alternating current of predetermined frequency connected in circuit with the bridge at the input points, the bridge being arranged to be in an unbalanced state, so long as any liquid remains in the container, a direct reading electric instrument, the output terminals of the bridge being connected with the instrument which is calibrated to indicate at any time the amount of liquid in the container in accordance with changes in the magnitude of the current flowing from said output terminals, and means for instantaneously checking the condenser unit of the container, said checking means comprising a condenser having a capacity equal to that of the immersion condenser unit in the container when the container is empty, plus the capacity of the cable connecting said condenser unit to the alternating bridge circuit, and another condenser equal to the capacity of the immersion and condenser unit with the container filled to the maximum content plus the capacity of the cable connecting said unit to the alternating bridge circuit, and means for independently switching either of said checking condensers to the alternating current bridge circuit in place of the immersion condenser unit.

7. An apparatus for measuring and indicating the quantity of liquid in a container, comprising an immersion unit located in the container and for which the liquid itself forms the dielectric, an alternating current bridge circuit having two condensers of fixed and equal capacity each forming an arm of the bridge, the remaining arms being made up of a variable capacity condenser and the condenser unit of the container respectively, a source of alternating current of predetermined frequency connected in circuit with the bridge at the input points thereof, the bridge being arranged to be in an unbalanced state so long as any liquid remains in the container, a direct reading electric instrument, the output terminals of the bridge being connected with the instrument which is calibrated to indicate at any time the amount of liquid in the container in accordance with changes in the magnitude of the current flowing from said output terminal, and a safety condenser having a capacity many times larger than the capacity of the immersion condenser unit and its associated cables connected into the lead from the alternating current bridge circuit to the immersion condenser unit in the container.

OLIVER WALTER REID.
ERROL du PREEZ ERASMUS.